United States Patent
Joshi et al.

(10) Patent No.: US 11,098,455 B2
(45) Date of Patent: Aug. 24, 2021

(54) SYSTEMS AND METHODS FOR DATA ACQUISITION AND ASSET INSPECTION IN PRESENCE OF MAGNETIC INTERFERENCE

(71) Applicant: Tata Consultancy Services Limited, Mumbai (IN)

(72) Inventors: Sunil Dattatraya Joshi, Thane (IN); Mayank Mishra, Thane (IN); Vaibhav Vyawahare, Mumbai (IN); Shripad Salsingikar, Thane (IN); Jayavardhana Rama Gubbi Lakshminarasimha, Bangalore (IN); Srinivas Kotamraju, Hyderabad (IN); Sreehari Kumar Bhogineni, Bangalore (IN); Rishin Raj, Bengaluru (IN); Vishnu Hariharan Anand, Bengaluru (IN); Vishal Bajpai, Bengaluru (IN); Jegan Mohan Ponraj, Bengaluru (IN); Mahesh Rangarajan, Bengaluru (IN); Balamuralidhar Purushothaman, Bengaluru (IN); Gopi Kandaswamy, Kancheepuram (IN)

(73) Assignee: Tata Consultancy Services Limited, Mumbai (IN)

( * ) Notice: Subject to any disclaimer, the term of this patent is extended or adjusted under 35 U.S.C. 154(b) by 56 days.

(21) Appl. No.: 16/432,448

(22) Filed: Jun. 5, 2019

(65) Prior Publication Data

US 2019/0368133 A1 Dec. 5, 2019

(30) Foreign Application Priority Data

Jun. 5, 2018 (IN) .............................. 201821020933

(51) Int. Cl.
*E01B 35/06* (2006.01)
*G06N 20/00* (2019.01)
(Continued)

(52) U.S. Cl.
CPC ............ *E01B 35/06* (2013.01); *B64C 39/024* (2013.01); *G06N 20/00* (2019.01); *G06T 7/0004* (2013.01);
(Continued)

(58) Field of Classification Search
CPC ............ B64C 2201/123; B64C 39/024; B64C 2201/141; E01B 35/06; G06N 20/00;
(Continued)

(56) References Cited

U.S. PATENT DOCUMENTS 9,162,753 B1   10/2015  Panto et al.
9,805,456 B1 * 10/2017  Harvey ............. G06K 9/00651
(Continued)

*Primary Examiner* — Michael J Vanchy, Jr.
(74) *Attorney, Agent, or Firm* — Finnegan, Henderson, Farabow, Garrett & Dunner, LLP

(57) ABSTRACT

This disclosure relates generally to systems and methods for data acquisition and asset inspection in presence of magnetic interference. Data acquisition and assets inspection systems in many infrastructures such as railway, power line, and bridges provide inaccurate results in presence of magnetic interference. The proposed system and method proposes UAV based navigation through a dynamic correction path to inspect one or more assets in one or more infrastructures. A plurality of sensors are integrated with the UAV to acquire images of the one or more assets in presence of magnetic field. The acquired images are further processed to segment and detect anomalies in one or more parts of the one or more assets. The detected anomalies are further classified as potential anomalies and non-potential anomalies. The proposed method provides accurate results with reduced processing time.

9 Claims, 7 Drawing Sheets

(51) Int. Cl.
  *B64C 39/02* (2006.01)
  *G06T 7/00* (2017.01)
  *G06T 7/11* (2017.01)
(52) U.S. Cl.
  CPC .......... *G06T 7/11* (2017.01); *B64C 2201/123* (2013.01); *G06T 2207/10048* (2013.01); *G06T 2207/30108* (2013.01)
(58) Field of Classification Search
  CPC . G06T 2207/10016; G06T 2207/10024; G06T 2207/10036; G06T 2207/10048; G06T 2207/20081; G06T 2207/30108; G06T 2207/30164; G06T 2207/30184; G06T 7/0004; G06T 7/11; G01R 29/085; G05D 1/0094; G06K 9/00637; G06K 9/00651; G06K 9/4604; G06K 9/52; G06K 9/6267; G08G 5/0034; G08G 5/0069; G08G 5/0086; G08G 5/045; G21C 17/013; G21C 17/017
  See application file for complete search history.

(56) References Cited

U.S. PATENT DOCUMENTS

| | | |
|---|---|---|
| 9,911,340 B2 | 3/2018 | Samarasekera et al. |
| 2017/0336806 A1* | 11/2017 | Blanc-Paques ........ G08G 5/045 |
| 2018/0321692 A1 | 11/2018 | Castillo-Effen et al. |
| 2019/0019589 A1* | 1/2019 | Waite ................... G06T 7/0008 |

* cited by examiner

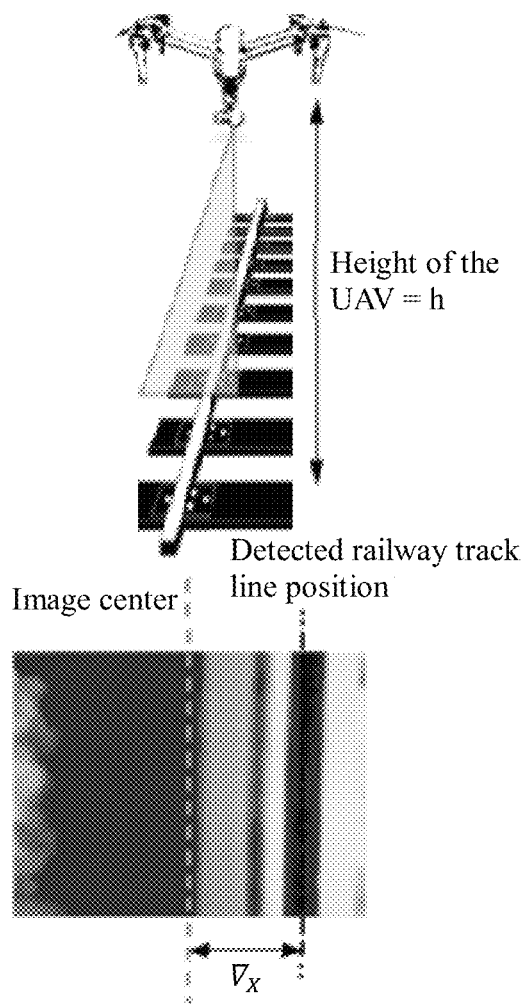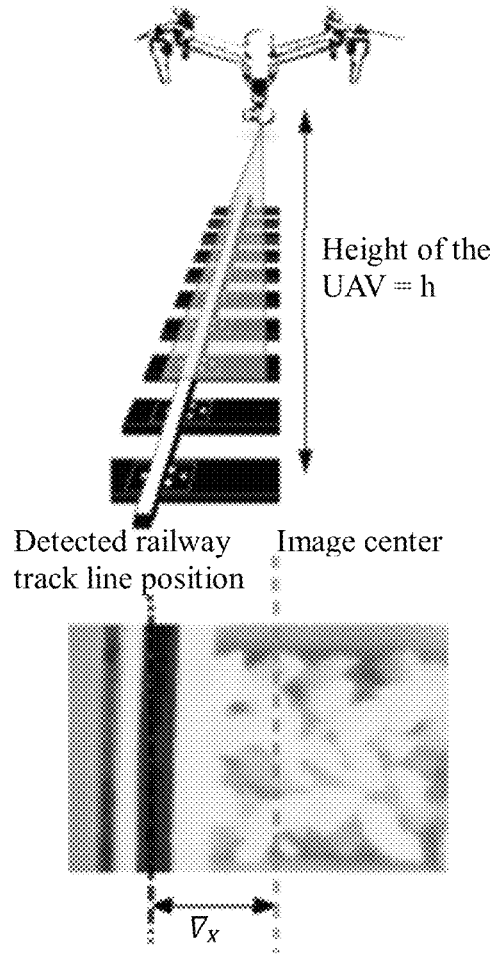
FIG. 6B
FIG. 6C

SYSTEMS AND METHODS FOR DATA ACQUISITION AND ASSET INSPECTION IN PRESENCE OF MAGNETIC INTERFERENCE

PRIORITY CLAIM

This U.S. patent application claims priority under 35 U.S.C. § 119 to: India Application No. 201821020933, filed on Jun. 5, 2019. The entire contents of the aforementioned application are incorporated herein by reference.

TECHNICAL FIELD

This disclosure herein generally relates to data acquisition and asset inspection, and, more particularly, to systems and methods for data acquisition and asset inspection in presence of magnetic interference.

BACKGROUND

Machines, devices or assets, generally, are engineered to perform particular tasks as part of a process in different infrastructures. Assets are used and maintained for many industrial sectors including energy, transportation, healthcare, manufacturing, and the like. For example, in railway infrastructures, assets such as railway tracks are used and maintained for transportation. However, efficiency of railway infrastructures hinges on safety and reliability. Thus, regular inspection or monitoring of assets is necessary or helpful to detect and document problems, to identify and reduce equipment failures, to ensure safe operating conditions and to plan and prioritize scheduled or emergency maintenance.

Typically, asset inspection and maintenance involves human intervention which includes an expert or a technician of a particular type of asset. However, manned inspection may expose the experts and public to danger because the inspection process often requires physical access of the inaccessible or risk prone areas of the structures to enable detailed inspections, and operating under those conditions can reduce safety margins. For example, identifying missing fish plate between rails, inspection of assets such as blades of a wind turbine, the tower of a gas flare, or the like, are difficult and have a risk of a potential injury.

There exist systems that provide automated mechanisms for asset inspection to reduce human intervention. In several scenarios, assets can be placed in challenging environments obstructed by forest growth, watercourses, or obstacles, particularly when a natural disaster has caused downed trees and other hazards. In modern days, the obstacle can include waves and radiations that could interfere in the use of modern semi-conductor based devices. Data acquisition using traditional automated methods becomes challenging in such scenarios.

SUMMARY

Embodiments of the present disclosure present technological improvements as solutions to one or more of the above-mentioned technical problems recognized by the inventors in conventional systems. For example, in one aspect, a processor implemented method for data acquisition and asset inspection in presence of magnetic interference is provided. The processor implemented method comprising: estimating, an initial position of an unmanned aerial vehicle (UAV) inspecting one or more assets in one or more infrastructures; determining, using a plurality of sensors integrated with the UAV, information related to orientation and direction of the UAV in presence of magnetic interference. In an embodiment, the plurality of sensors include a thermal camera, multi-spectral cameras, RGB cameras or combinations thereof. In an embodiment, the method further comprising acquiring, by navigating the UAV over the one or more assets in the presence of magnetic interference through a dynamically corrected flight path, data pertaining to one or more parts of the one or more assets, wherein at least a subset of the data acquired comprises a plurality of images captured from multiple views. In an embodiment, the plurality of images are acquired at different wavelengths during navigation of the UAV. In an embodiment, the method further comprising identifying, using domain knowledge driven machine learning technique(s), a region of interest (ROI) in the one or more parts of the one or more assets to obtain a plurality of segmented ROI images; extracting, a plurality of features from each of the plurality of segmented ROI images to detect anomalies in the one or more assets; and classifying, the detected anomalies as one of (i) a potential anomaly or (ii) a non-potential anomaly to predict failure of the one or more assets. In the embodiment, potential anomalies are further categorized as long-term impact, medium-term impact, short-term impact and immediate impact anomalies using an unsupervised learning technique.

In another aspect, a system for data acquisition and asset inspection in presence of magnetic interference is provided. The system comprising: a memory storing instructions; one or more communication interfaces; and one or more hardware processors coupled to the memory through the one or more communication interfaces, wherein the one or more hardware processors are configured by the instructions to estimate, an initial position of an unmanned aerial vehicle (UAV) inspecting one or more assets in one or more infrastructures; determine, using a plurality of sensors integrated with the UAV, information related to orientation and direction of the UAV in presence of magnetic interference. In an embodiment, the plurality of sensors include a thermal camera, multi-spectral cameras, RGB cameras or combinations thereof. In an embodiment, the one or more hardware processors are further configured by the instructions to acquire, by navigating the UAV over the one or more assets in the presence of magnetic interference through a dynamically corrected flight path, data pertaining to one or more parts of the one or more assets, wherein at least a subset of the data acquired comprises a plurality of images captured from multiple views. In an embodiment, the plurality of images are acquired at different wavelengths during navigation of the UAV. In an embodiment, the one or more hardware processors are further configured by the instructions to identify, using domain knowledge driven machine learning technique(s), a region of interest (ROI) in the one or more parts of the one or more assets to obtain a plurality of segmented ROI images; extract, a plurality of features from each of the plurality of segmented ROI images to detect anomalies in the one or more assets; and classify, the detected anomalies as one of (i) a potential anomaly or (ii) a non-potential anomaly to predict failure of the one or more assets. In an embodiment, the potential anomalies are further categorized as long-term impact, medium-term impact, short-term impact and immediate impact anomalies using an unsupervised learning technique.

In yet another aspect, one or more non-transitory computer readable mediums for data acquisition and asset inspection in presence of magnetic interference is provided. The one or more non-transitory computer readable mediums comprising one or more instructions which when executed by one or more hardware processors cause estimating, an initial position of an unmanned aerial vehicle (UAV) inspecting one or more assets in one or more infrastructures; determining, using a plurality of sensors integrated with the UAV, information related to orientation and direction of the UAV in presence of magnetic interference. In an embodiment, the plurality of sensors include a thermal camera, multi-spectral cameras, RGB cameras or combinations thereof. In an embodiment, the instructions may further cause acquiring, by navigating the UAV over the one or more assets in the presence of magnetic interference through a dynamically corrected flight path, data pertaining to one or more parts of the one or more assets, wherein at least a subset of the data acquired comprises a plurality of images captured from multiple views. In an embodiment, the plurality of images are acquired at different wavelengths during navigation of the UAV. In an embodiment, the instructions may further cause identifying, using domain knowledge driven machine learning technique(s), a region of interest (ROI) in the one or more parts of the one or more assets to obtain a plurality of segmented ROI images; extracting, a plurality of features from each of the plurality of segmented ROI images to detect anomalies in the one or more assets; and classifying, the detected anomalies as one of (i) a potential anomaly or (ii) a non-potential anomaly to predict failure of the one or more assets. In the embodiment, potential anomalies are further categorized as long-term impact, medium-term impact, short-term impact and immediate impact anomalies using an unsupervised learning technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 6A, 6B and 6C shows results illustrating navigation of the UAV through a dynamically corrected flight path in accordance with some embodiments of the present disclosure.

DETAILED DESCRIPTION

Figure 1:
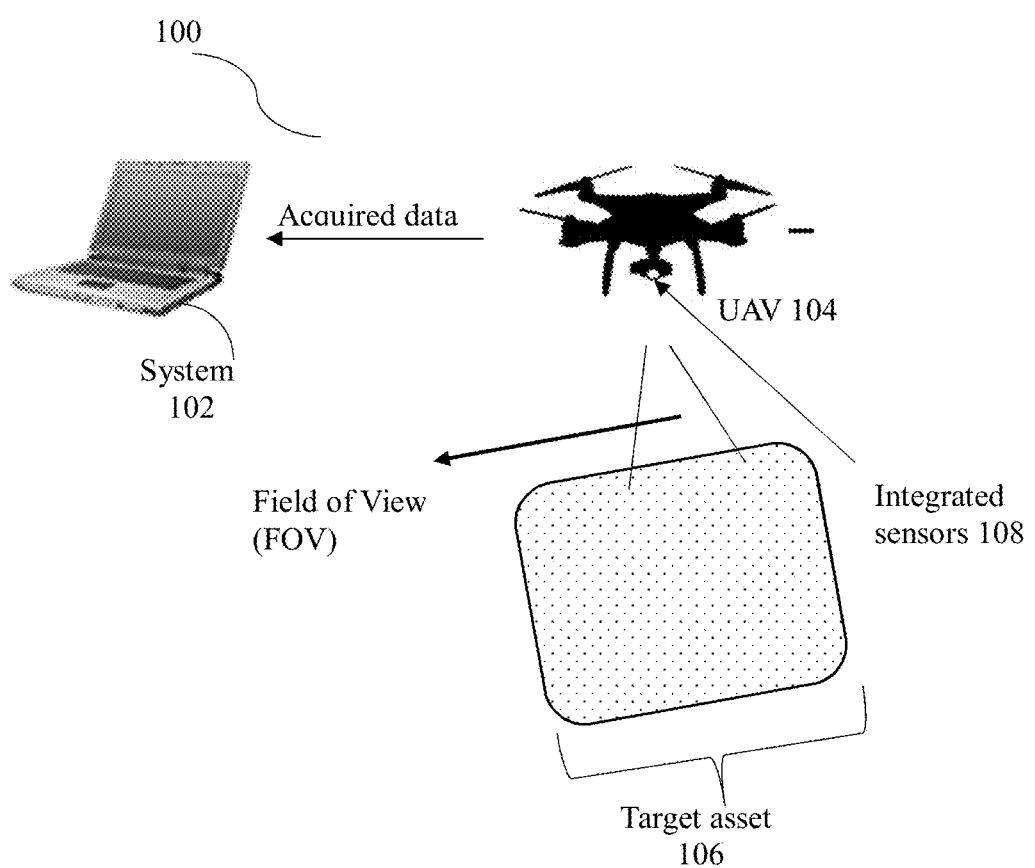
FIG. 1 illustrates an exemplary UAV environment with magnetic interference comprising a system for data acquisition and inspection by navigating the UAV across different parts of a target asset according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide systems and methods for data acquisition and asset inspection in presence of magnetic interference. The typical interpretation of results obtained from conventional data acquisition and asset inspection systems has been modified to solve a problem where highly accurate data is acquired in the presence of magnetic interference. Conventional systems and methods fail to acquire accurate data in the presence of magnetic interference. The proposed method and system performs data acquisition by navigating unmanned aerial vehicles (UAVs) in the presence of magnetic interference for asset inspection. The acquired data is further fused with data provided by a plurality of sensors integrated with the UAV. The integrated data is highly accurate and further utilized for inspection of assets employed in different infrastructures (e.g. railway infrastructure). Asset inspection is performed to detect defects or anomalies in the assets used in infrastructures. For example, in railway infrastructures, regular inspection of railway tracks is required to identify any defects or anomalies to ensure safety by taking corrective actions before incidents or failures occur. Since, different parts of same asset or different assets may contain multiple type of defects or anomalies, the method of the present disclosure performs inspection of different parts of the same asset (alternatively referred as sub-asset inspection) to identify defects or anomalies. The identified defects or anomalies are further classified based on their impact to predict failure of the assets.

Referring now to the drawings, and more particularly to FIGS. 1 through 6C, where similar reference characters denote corresponding features consistently throughout the figures, there are shown preferred embodiments and these embodiments are described in the context of the following exemplary system and/or method.

FIG. 1 illustrates an exemplary UAV environment with magnetic interference 100 comprising a system 102 for data acquisition and inspection by navigating a UAV across different parts of a target asset 106, in accordance with an embodiment of present disclosure. The UAV environment with magnetic interference 100, utilizes a UAV 104 placed at an initial distance to a target asset 106, whose condition is to be monitored by detecting defects or anomalies in the target asset 106. The UAV here could be a drone, a flying apparatus/device (e.g., helicopter), a robotic device and the like. The UAV is also provided with a plurality of sensors and other data acquisition equipment such as a Global positioning system (GPS), an inertial measurement unit (IMU), and ultrasound sensors, which are integrated (referred as integrated sensors 108 in FIG. 1) with the UAV. The plurality of sensors include one or more thermal cameras, one or more vision cameras and the like. In an embodiment, Global Positioning System (GPS) is used to provide the positional information of the UAV 104 and this positional information is augmented with the inertial measurement unit (IMU) data to get orientation of the unmanned vehicle.

In an example embodiment, the UAV and the plurality of sensors integrated with it acquire data from the target asset 106. The system 102 is configured to process and analyze the acquired data and generate a draft inspection report (e.g., via one or more communication medium(s)) describing the health of the target asset 106 to an end user, for example an operator or an expert. In other words, the system 102 is configured to automatically identify anomalies present or operating conditions in one or more assets in one or more infrastructures, fixed or moving, using an unmanned aerial vehicle (UAV) including drones and the plurality of sensors integrated with the UAV 104. In an embodiment, the system can be a computer, cloud or edge device. In an embodiment, system 102 can either be implemented as a standalone unit or reside on the UAV 104.

Figure 2:
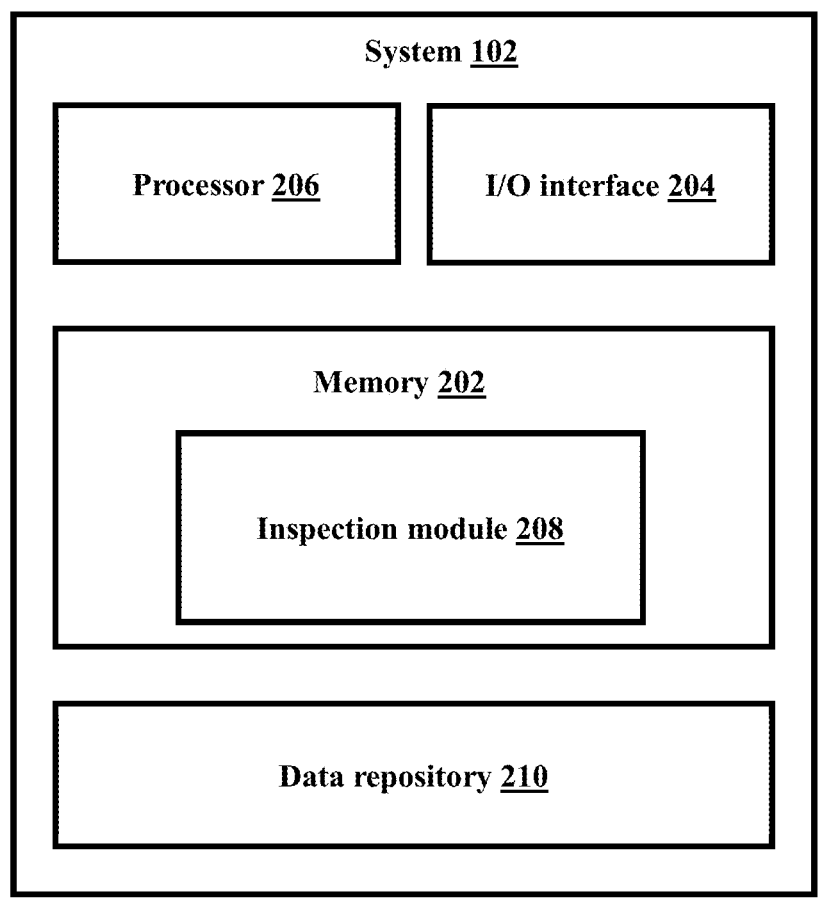
FIG. 2 is a functional block diagram of the system of FIG. 1 for data acquisition and asset inspection in the presence of magnetic interference according to some embodiments of the present disclosure.
Figure 3:
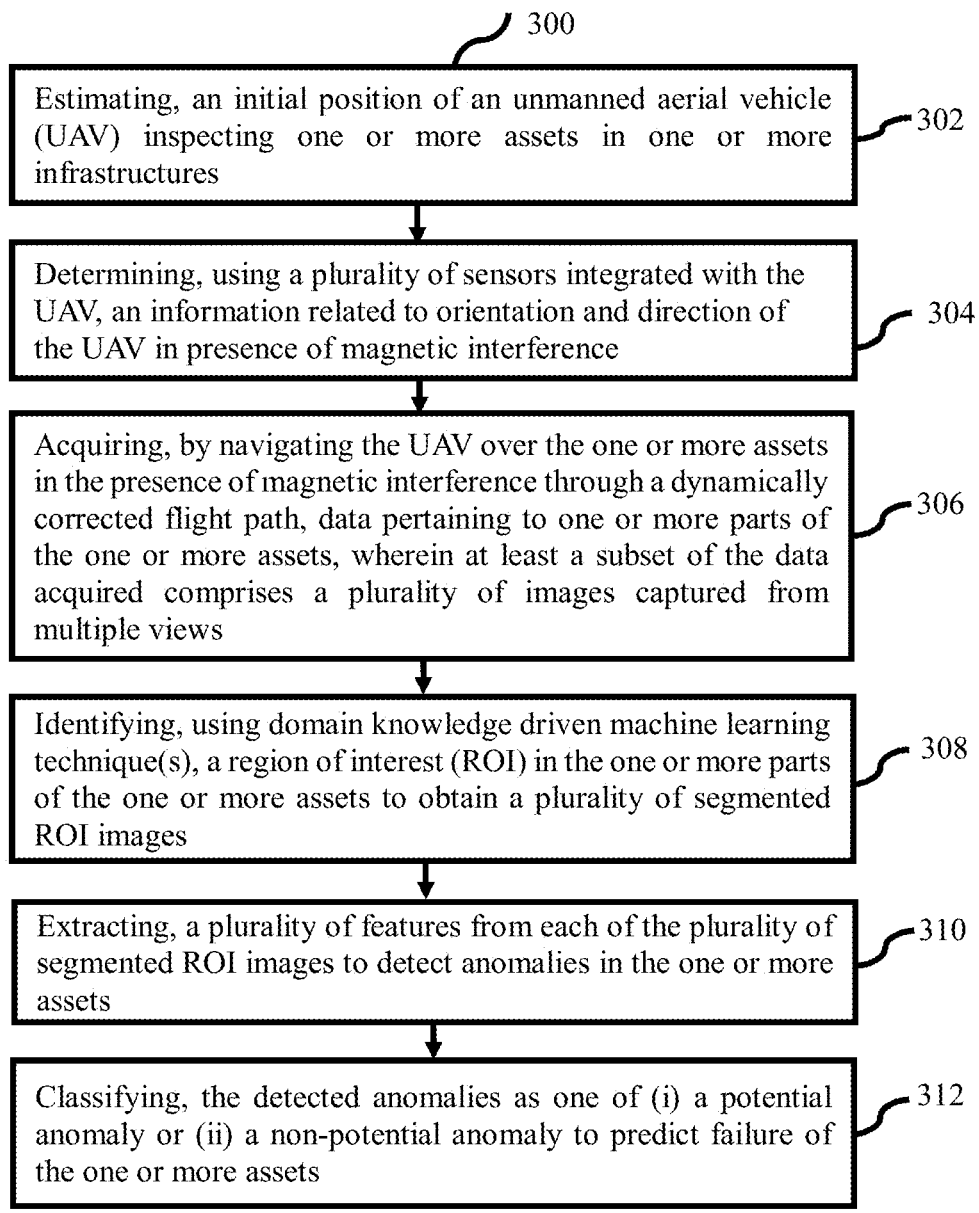
FIG. 3 is a flow diagram illustrating a method for data acquisition and asset inspection in the presence of magnetic interference in accordance with some embodiments of the present disclosure.

The system 102 is configured to process and analyze the acquired data in accordance with an inspection module, further explained in conjunction with FIG. 2 and FIG. 3. Thus, the system 102 is configured to acquire data and inspect assets in presence of magnetic interference utilizing the UAV 104 and provide an alert or notification to the end user, in case the anomaly detected reaches a pre-defined threshold and require immediate attention. The UAV 104, is placed at an initial height from the target asset 106 but can operate (or flies) at different heights to capture the data pertaining to different parts of the target asset from different angles.

The acquired data, comprises thermal and visual images of the different parts of target asset 106, positional information, direction and orientation of the UAV, and the like. Thus, information related to the health of the target asset acquired by the UAV and integrated sensors is further processed by the system 102. In an embodiment, the target asset 106 can be stationary or moving, for example, railway track is a stationary asset whereas wheels of a train are moving assets.

FIG. 2 illustrates an exemplary block diagram of the system 102 for data acquisition and asset inspection in the presence of magnetic interference, in accordance with an embodiment of the present disclosure. In an embodiment, the system 102 includes one or more processors 206, communication interface device(s) or input/output (I/O) interface(s) 204, and one or more data storage devices or memory 202 operatively coupled to the one or more processors 206, and an inspection module 208. In an embodiment, the inspection module 208 can be implemented as a standalone unit in the system 100. In another embodiment, the inspection module 208 can be implemented as a module in the memory 202. The processor 106, the I/O interface 104, and the memory 102, may be coupled by a system bus.

The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 102 can be implemented in a variety of computing systems, such as laptop computers, notebooks, hand-held devices, edge devices, on-board devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 206 receives the data acquired by navigating the UAV integrated with the plurality of sensors.

The memory 202 may include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. In an embodiment, the memory 202 includes an inspection module 208 and a repository 210 for storing data processed, received, and generated by inspection module 208. The inspection module 208 may include routines, programs, objects, components, data structures, and so on, which perform particular tasks or implement particular abstract data types.

The data repository 210, amongst other things, includes a system database and other data. The other data may include data generated as a result of the execution of the inspection module 208 such as preliminary, intermediate and final datasets involved in techniques that are described herein. The system database stores data received from a plurality of sensors, data acquired during navigation of UAVs as a part of the inspection, and corresponding output which are generated as a result of the execution of the inspection module 208. The data stored in the system database can be learnt to improve failure prediction.

In an embodiment, the inspection module 208 can be configured to acquire data and perform asset inspection in the presence of magnetic interference. Data acquisition and asset inspection in the presence of magnetic interference can be carried out by using methodology, described in conjunction with FIG. 3 and use case examples.

FIG. 3 illustrates an exemplary flow diagram of a method 300, implemented by the system 102 of FIG. 1 and FIG. 2 to acquire data using UAV for inspection of target asset 106 (Herein railway tracks) in presence of magnetic interference, in accordance with an embodiment of the present disclosure. In an embodiment, the system 102 comprises one or more data storage devices or the memory 202 operatively coupled to the one or more hardware processors 206 and is configured to store instructions for execution of steps of the method 300 by the one or more hardware processors 206. The steps of the method 300 of the present disclosure will now be explained with reference to the components of the system 102 as depicted in FIG. 1 and FIG. 2 and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Referring to FIG. 3, at step 302, the one or more hardware processors are configured to estimate, an initial position of an unmanned aerial vehicle (UAV) inspecting one or more assets in one or more infrastructures. In an embodiment, prior to the flight of the UAV, a plurality of sensors including thermal cameras, visual cameras, multispectral cameras, and RGB cameras are deployed on the UAV and focus areas of each camera are calibrated. Further, the initial position of an unmanned aerial vehicle is estimated using GPS and IMU and ultrasonic sensors. For example, it is assumed that the UAV takes off to a high altitude (say 15 m) from the target assets. At this height, GPS and IMU function properly. However, the UAV is switched from GPS and IMU mode to image mode by switching on cameras and weights for IMU are reduced at this instance. Using the plurality of sensors such as thermal cameras, visual cameras, multispectral cameras, and RGB cameras, the UAV is lowered by some distance (e.g., say to 4 m in the present disclosure), which is considered as the initial position of the UAV. If the values estimated using the GPS and the IMU fluctuate, the initial position is estimated using the thermal camera and are taken with higher bias factor for compensating the error introduced by the GPS and the IMU. In an embodiment, initial coordinates of the UAV in three dimensions are considered to be (0,0,0).

Further, as depicted in step 304 of FIG. 3, the one or more hardware processors are configured to determine information related to orientation and direction of the UAV in presence of magnetic interference using the plurality of sensors integrated with the UAV. In an embodiment, traditional systems utilize positional information provided by the GPS which is augmented with the IMU data to get the orientation of the UAV. However, in cases, where GPS information is compromised due to tall trees, buildings or cloud presence, it becomes difficult to determine the orientation of the UAV. Further, in the presence of magnetic interference, the IMU becomes non-functional making it difficult to get the orientation and direction of the UAV. There exist methods determining information related to orientation and direction of the UAV in the presence of magnetic interference using a magnetic compass mounted on the UAV. Such methods provide angular deviation of the UAV with respect to the magnetic north of earth. The accuracy of the instrument in such cases depends on magnet or magnetic material around the compass. In case of railway tracks, the effect of magnetic interference is not much if the UAV flies over 15 m from the grounds. However, if the UAV flies in between the railway track lines and at less than 4 m above the line, the UAV loses directional stability and sense of direction which results in a crash of the UAV. Further, in the presence of magnetic interference, GPS becomes weak. In GPS weak areas, traditional systems provide inaccurate information related to the orientation and direction of the UAV, which further results in acquiring inaccurate data during data acquisition. However, the method of the present disclosure determines accurate information related to orientation and direction using images captured by the thermal cameras, visual cameras, multispectral cameras, and RGB cameras. For example, in case of a railway track line, a deviation in distance of the railway track line from center of a captured image of same railway track line and an angle of deviation from camera center axis is calculated. Based on the angle of deviation, the UAV corrects its orientation.

Figure 4:
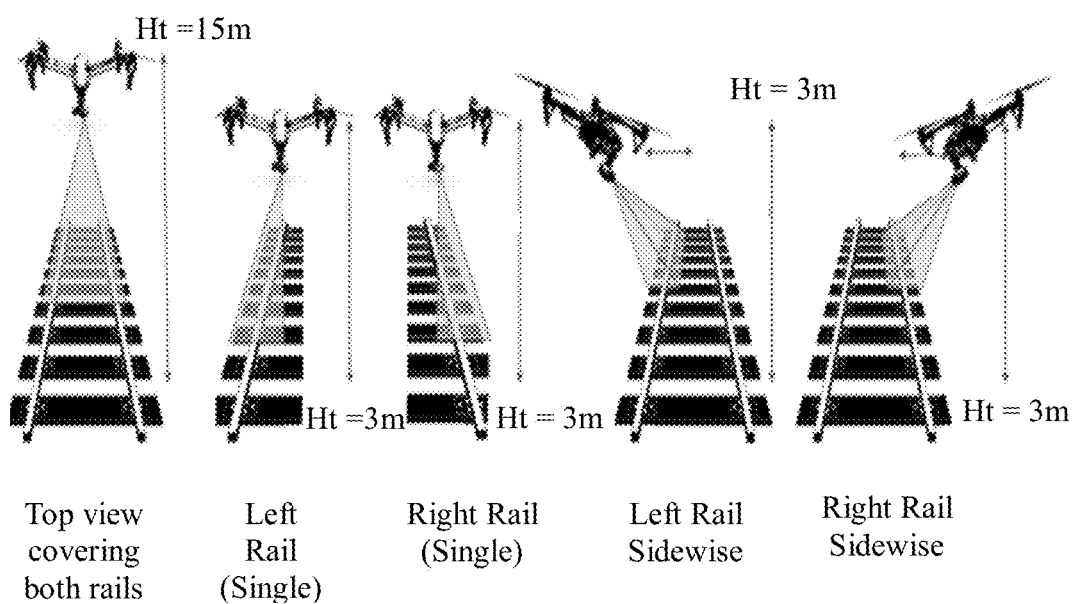
FIG. 4 illustrates navigation of the UAV over different parts of the target asset from different heights according to some embodiments of the present disclosure.
Figure 5:
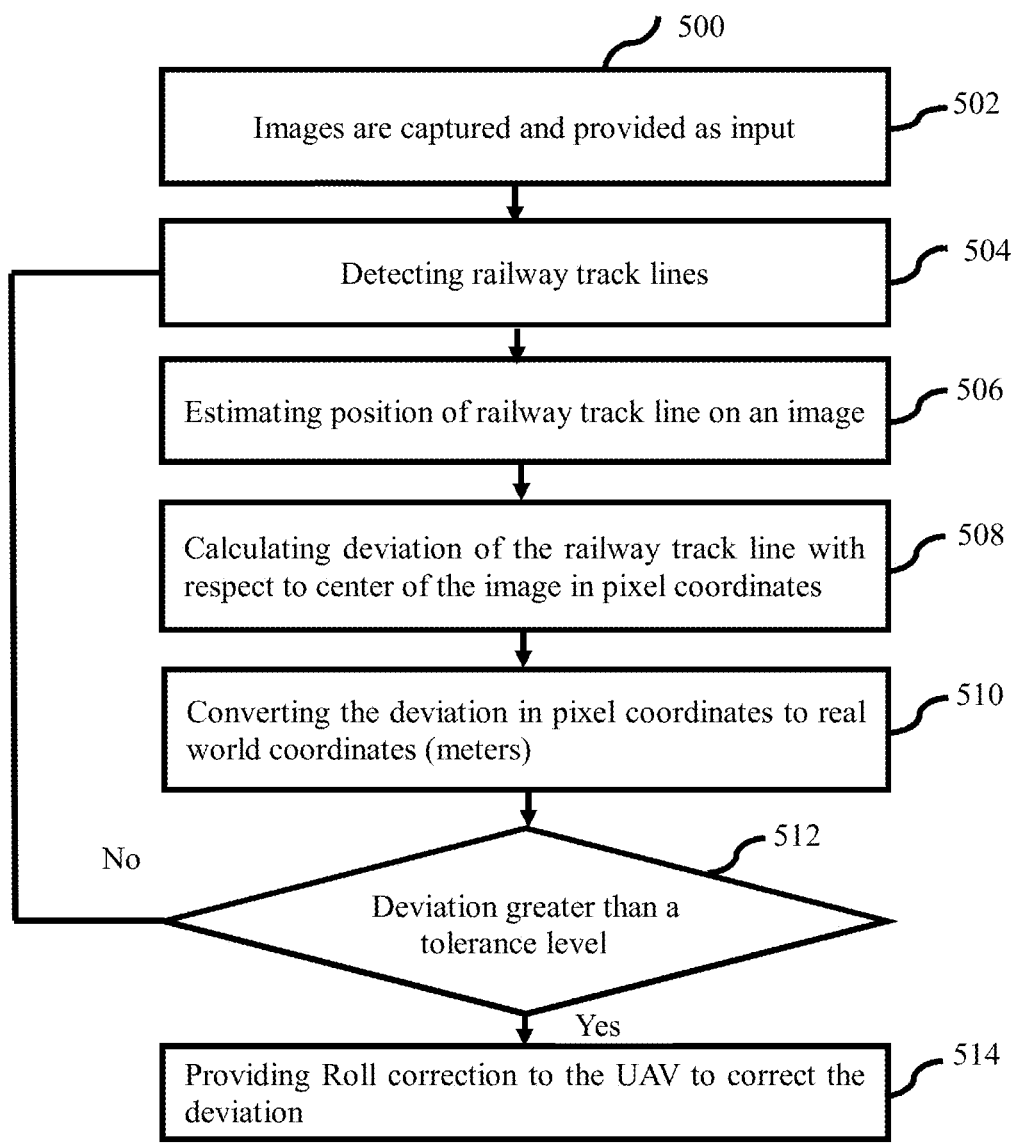
FIG. 5 is a flow diagram illustrating navigation of the UAV through a dynamically corrected flight path in accordance with some embodiments of the present disclosure.
Figure 6A:
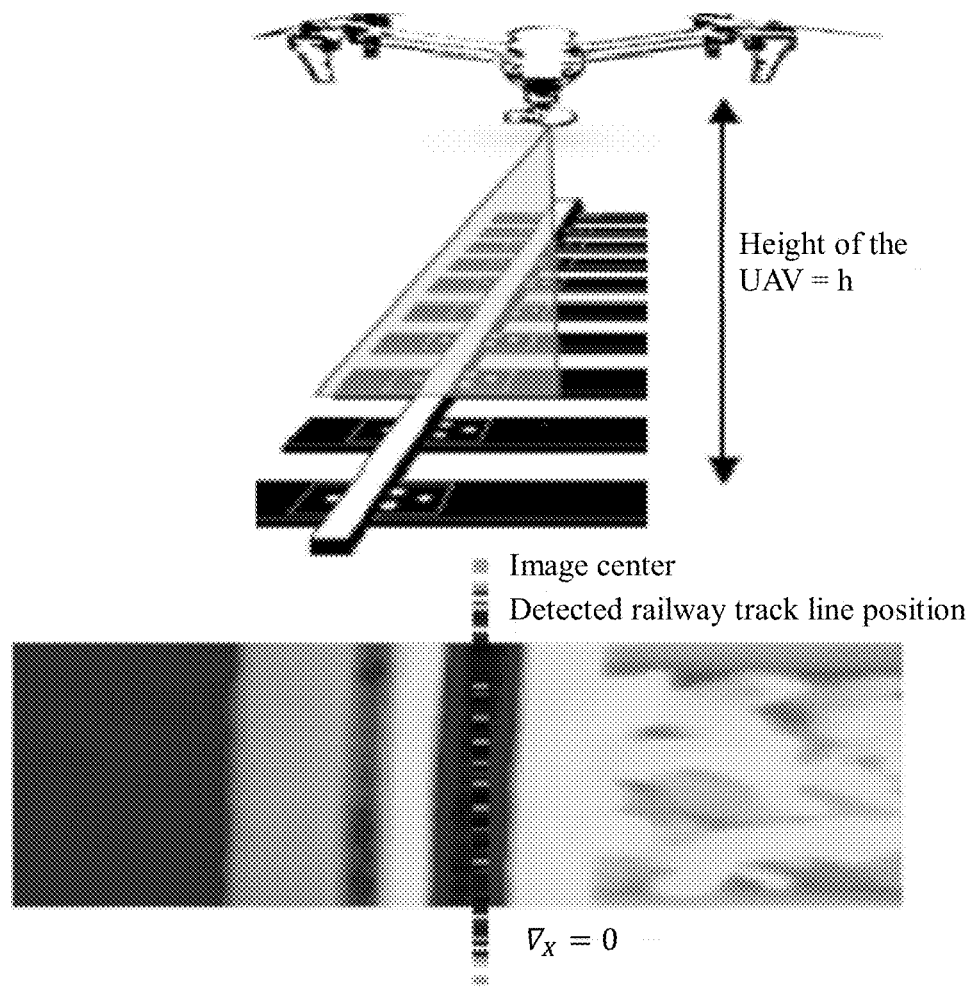

Further, at step 306 of FIG. 3, the one or more hardware processors acquire, by navigating the UAV over the one or more assets in the presence of magnetic interference through a dynamic flight path, data pertaining to one or more parts of the one or more assets, wherein at least a subset the data acquired comprises a plurality of images captured from multiple views. In an embodiment, the UAV is being programmed to fly autonomously with the help of GPS through a series of waypoints based upon the elevations and the points of interest such as utility pole structures and under towers, or around other structures such as buildings and bridges. In an embodiment, the plurality of images are acquired at different wavelengths during navigation of the UAV. For example, if the navigation of the UAV starts from the initial position (say 15 metre height). As can be seen in FIG. 4, for railway track line inspection, the UAV navigates over the railway track lines from different heights vertically, horizontally and from multiple angles. It can be seen from FIG. 4, that both the railways track lines are covered from the high altitude (e.g. 15 m) which helps in capturing images of both the parallel railway tack lines vertically. Further, the UAV navigates at a low altitude (say 4 m) with a speed of 2 m/s to capture images of single railway track lines vertically and horizontally. Similarly, the UAV navigates at different heights from the assets to be inspected. In an embodiment, the plurality of images captured includes thermal images, multispectral images, RGB images, visual images and the like. Further, the navigation of the UAV through a dynamically corrected flight path is illustrated with the help of FIG. 5 and FIGS. 6A through 6B. As can be seen in FIGS. 6A through 6C, the UAV navigates over left railway track line from a height (say 'h') to capture images for inspection. During navigation, position of the railway track line in the thermal images (whether it is at the center or sideward) is used to detect drift in the position of the UAV such that it can be corrected further. As can be seen in FIG. 5, at step 502, a plurality of images are captured including thermal images, visual images, and multispectral images. Further, at step 604 of FIG. 6, railway track lines are detected from the plurality of images. A patch based neural network is built for detecting railway track lines from visual camera image and multi-spectral camera image and an adaptive threshold based method is used for detecting railway track lines from thermal images. For example, in case of RGB camera, captured images are split into small size non-overlapping patches and these patches are analyzed for the detection of railway track lines using a convolutional neural network. This approach is applied only in initial image. In progressive images, intelligence from previously detected region of interest is considered for path extraction. Further, for navigation, thermal images are used due to high contrast. Resulting high contrast images can be used for navigation by employing adaptive threshold based method. This can be implemented on the UAV where computational capacity is low. Since the railway track lines are made of metal, relative temperature of the railway track lines with respect to surroundings is higher. Conventionally, a global threshold method was used on all pixels for detecting railway track lines from thermal images. However, in the method of proposed disclosure, the adaptive threshold based method is used which changes the threshold dynamically over the image based on relative variation of temperature of the railway track lines with respect to surroundings. So by using the adaptive threshold based method on the thermal images, railway track lines can be easily segmented out from rest of the scene. The segmented railway track lines allow calculation of a drift and a yaw that can be used for changing the orientation of the UAV. In an embodiment, a registration algorithm is used for aligning the plurality of images captured from different cameras. Further, as depicted in step 506 of FIG. 5, the position of the railway track line is estimated on captured image. Further, as depicted in step 508 of FIG. 5, deviation of railway track line with respect to center of the captured image is calculated in terms of pixel coordinates. Further, as depicted in step 510 of FIG. 5, the deviation calculated in terms of pixel coordinates are converted to coordinates in meters. FIG. 6A shows the correct position of the railway track line with no deviation from center of the captured image. As can be seen in FIGS. 6B and 6C, the detected railway track line deviates from the center of capture image by $\nabla_x$. Furthermore, as depicted in step 512 of the FIG. 5, if the calculated deviation exceeds a tolerance level, then the position of the UAV is corrected by providing a roll correction as depicted further in step 514 of FIG. 5, wherein the roll correction enables the UAV to move and reach the correct position. In an embodiment, the tolerance level is 10 to 15 cm for roll correction. However, method described in FIG. 5 can be applied to correction of orientation (alternatively referred as yaw correction) with a tolerance level of 5 degrees.

In an embodiment, a scenario of navigating over a junction is discussed. At a junction, the railway track line should split into another track or it should merge into the main track. To ensure that the correct line is followed, visual scene analysis is used for detecting that region. Field of View (FoV) of visual camera is more than FoV of thermal cameras. Hence, the domain knowledge about the junction that is automatically captured using visual camera helps the UAV to navigate along the correct line in spite of two lines available in the thermal image field of view.

Referring back to FIG. 3, at step 308, the one or more hardware processors are configured to identify, using domain knowledge driven machine learning technique(s), a region of interest (ROI) in the one or more parts of the one or more assets to obtain a plurality of segmented ROI images. In an embodiment, the domain knowledge driven machine learning technique(s) help in determining what parts of an asset are contained in a captured image which is stored as domain knowledge. Further, based on this domain knowledge, subparts or sub-assets (if any) are derived to apply specific anomaly detection algorithms. For example, in railway track line inspection, it is observed that missing bolts anomaly is always present on a fish plate which is stored as domain knowledge. Further, while checking for missing bolt anomaly in an identified fish plate region, the stored domain knowledge indicates that an entire image is not required to be inspected for such an anomaly. Further, suitable algorithms (comprised in the memory of the system 102) are dynamically chosen to obtain the segmented ROI images. In an embodiment, desired flight path leads to a colossal amount of data (e.g., images) for further processing, where many overlapping images contain the same sub-asset. In other words, it is observed that among overlapping images, there is a possibility that all of the images may not contain the relevant information or might be duplicated images for a particular asset/part/subpart. Such images are not required for further processing. Thus, prior to obtaining segmented ROI images, an image selection step for selecting a subset of images from the plurality of captured images is performed. The image selection step helps in reducing processing. Here, the image selection step is performed using supervised learning, wherein the supervised learning helps in selecting images by detecting presence of fish plate from visual images by neglecting other images. As the technique to identify the anomaly or defect is different for different parts of the assets (alternatively referred as sub-assets), thereby instead of entire image of an asset, a sub-asset ROI is created for performing defect or anomaly detection. This helps in reducing computation to a great extent. Here, sub-asset detection is performed using patch-based approach in deep learning. A patch-based approach divides an asset into patches of fixed size for detection of sub-asset. Each patch has one or more features including a specific texture, a specific frequency signature or a specific wavelet signature. The patches identified for a specific sub-asset are merged and refined as a post-processing step to segmentation process. Further, for ROI segmentation, image of a specific sub-asset is divided into patches (say, 32*32 or 128*128). A CNN based network with a pre-trained model is used and output of the network is post-processed using morphological operations to segment the sub-assets as the ROI image. The segmentation process helps in observing many false positives such as patches containing water being detected as an object. Hence, post-processing is performed using a masking approach, wherein using a smaller mask, relevant objects such as line, sleepers, anchors, and the like are detected in the images. Here, the lines are detected using thermal cameras and remaining objects are detected using domain intelligence and known layout of the track. Based on a relative distance from the detected railway track lines, other components are detected. Prominent objects in the railway asset such as lines and sleeper are first detected. Based on the segmentation and domain knowledge, other parts of the asset positions are derived. These region proposals are then used for detection of all other relevant objects belonging to the asset.

Further, as depicted in step 310 of FIG. 3, the one or more hardware processors extract, a plurality of features from each of the plurality of segmented ROI images to detect anomalies in the one or more assets. In an embodiment, the ROI images are divided into patches, and a plurality of features are computed for each patch. In an embodiment, the plurality of features include Fourier Transformation based features, Gray level co-occurrence matrix (GLCM) features, wavelet features and the like. In an embodiment, the Fourier Transformation based features include Mean, Variance, Skewness, Kurtosis, and Entropy (with their respective z-scores). In an embodiment, the GLCM features include dissimilarity, correlation, contrast, homogeneity, ASM, energy (with their z-scores). A support vector machine (SVM) classifier is trained using the extracted features to identify the patches having defects or anomalies such as cracks and discoloration. Since the SVM identifies a lot of false positives and doesn't provide clear distinction of the cracks inside the identified patches, a Line Segment Detection (LSD) is applied only on the patches identified as affected with cracks. The output of the LSD is dilated so that the lines merge. This adds an advantage of selecting large cracks while rejecting smaller ones based on a threshold. Small cracks identified may be false positives and there is possibility that those are not even actual cracks. Hence based on a threshold, false positives are removed. The threshold is dynamic and is totally data dependent, in an example embodiment of the present disclosure. For railways, the threshold is pre-calculated during training phase and is used for testing making it fully automatic at runtime.

Referring back to FIG. 3, at step 312, the one or more hardware processors are configured to classify, the detected anomalies as one of (i) a potential anomaly or (ii) a non-potential anomaly to predict failure of the one or more assets. In an embodiment, the potential anomaly is defined as an anomaly which can cause severe damage to an asset/part/subpart. For example, in railway track line, the potential anomaly could be, but not limited to, missing anchor, missing fish plate, missing bolts, wheel burn on rails, and the like. Similarly, for power line, the potential anomaly could be but not limited to tower inspections missing joint plate, missing joint plate bolt and the like. The potential anomalies have both high priority and high frequency of occurrence. In an embodiment, the detected anomalies are classified based on either: (a) use of pre-trained models for defect classification using supervised learning; and (b) using metrics generation or measurements extracted from visual images (e.g., width of rail, thickness of rail head). In an embodiment, models are built to classify the defects beforehand using training data. Models get trained on different types of defects to identify correct class for a given input image. For example, in case of wheel scrub, a pattern that is created on a rail is different from pattern that is created while running the rail with brakes on. If the collected data is insufficient, more image samples are generated using Generative Adversarial Networks (GAN) and a model is trained, which makes the existing models more robust. Many instances of both the defects are collected, features extracted and classified into a specific defect using machine learning methods. In case of power line inspection, use case input ROIs of broken dampers and corroded dampers are given to the model to learn and classify the defects correctly. In an embodiment, the metric generation involves computing distance of the UAV from the target asset. This distance can be calculated using Field of View (FoV) angle of the camera and the calibration values of the railway tracks using domain intelligence. Pixel Per Meter (PPM) for images is calculated. Further, autonomous flights help in keeping the UAV at a constant distance from the target asset, making metric generation robust. Based on this calculation, all the required metrics about the size of the anomalies are calculated and stored for further processing. For example, in case of a junction, nose of a train is considered most critical part for assessing wear and tear. In this case, the metrics derived from the thermal images give accurate width of the line that includes the nose of the rail. After detecting that there is a junction using supervised learning method, the width of the nose is calculated using visual images to detect the anomalies and subsequently classify the anomalies.

In an embodiment, the potential anomalies are further categorized as long-term impact, medium-term impact, short-term impact and immediate impact anomalies using an unsupervised learning technique. In an embodiment, anomalies like missing fish bolts, missing fish plates, visible cracks on trains, huge cracks on concrete or steel assets are considered as immediate impact anomalies which are required to be addressed immediately or which could potentially affect the safety of a bridge. For further categorization of anomalies using unsupervised learning, a plurality of clusters are created and values are assigned to each cluster like cluster:0, cluster:1, cluster:2, cluster: 3, cluster:4 and the like. Here cluster: 0 contains elements with no anomalies, cluster: 1 contains elements with short-impact anomalies, cluster 2: contains elements with medium-impact anomalies, cluster: 3 contains elements with long-impact anomalies, and cluster: 4 contains elements with immediate impact anomalies. In an embodiment, the plurality of clusters are created by a machine vision system beforehand by visually observing the data and automatically, the potential anomalies are categorized based on the resulting measurements from images.

In an embodiment, based on the inspection, a draft inspection report is generated with the problems analyzed and highlighted by the system 102. The draft inspection report is generated at the command central for further processing and remarks. Systems employed at the command central analyzes the inspection report and provides an option to agree or disagree on the anomaly that is detected by the UAV using the proposed system and method. If the systems employed at command central agrees with the anomaly detected by the system 102, then corrective actions are taken by the proposed system by sending an alert to repair department notifying the team with the instruction to go and repair the detected anomaly. If the systems employed at command central team disagrees that the anomaly detected does not have any potential problem, then it becomes learning for the machine learning algorithms (comprised in the memory of the system 102) not to consider such anomalies and such anomalies which are not accepted by the systems employed at command central are flagged. This enables dynamic learning of the detected anomalies to improve failure prediction of the one or more assets Experimental Results:

In an embodiment, based on a series of experiments, it is observed that detection of railway track lines using thermal images has more than 90% accuracy. Using thermal images and adaptive threshold calculation, the system of the present disclosure works in real time and is able to correct the drift and change in orientation within 25 cm. Since the UAV is moving at 2 m/sec, path of the UAV is recovered very quickly. In an embodiment, for visual detection of major components, the accuracy of the system of the present disclosure is over 80%. Further, errors are corrected using domain knowledge making overall accuracy more than 85%. Thus, it is observed that the accuracy is over 90% in detection of anomalies using thermal images and over 80% using visual images. Further, classification accuracy of known anomaly once detected is higher than 95% and small object detection accuracy is around 60% using the method of present disclosure. In an embodiment, it is identified that some anomalies can be easily identified using spectral information other than RGB images. For example, wheel burn in case of railways can be easy identified using thermal images, a simple threshold method is used for segmenting the anomalies. Another example is identifying vegetation on the asset which is easily identified using a multi spectral camera. For detection of same in RBG image a specific machine learning model would be required. Thus, the system of present disclosure also works well without using high computational capacity. In terms of human intervention, efforts made by railway staff for checking trains every day in morning for entire length which is enormous, are eliminated. The system of present disclosure provides an automatic UAV based system which can service this niche area very consistently and possibly more frequently. Further, the images captured enables assessment of the data in office which is far more effective than physically walking many kilometers by each rail man.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of data acquisition and asset inspection in presence of magnetic interference, wherein data acquisition becomes challenging in the presence of magnetic interference and leads to inaccurate results. The embodiment, thus provides acquiring data particularly images of one or more parts of assets under inspection using a UAV integrated with a plurality of sensors such as thermal cameras, visual cameras, and multispectral cameras. Data acquired from all these cameras by navigating the UAV over assets provides accurate results with reduced processing time.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
estimating (302), an initial position of an unmanned aerial vehicle (UAV) inspecting one or more assets in one or more infrastructures;
determining (304), using a plurality of sensors integrated with the UAV, information related to orientation and direction of the UAV in presence of magnetic interference, wherein the plurality of sensors integrated with the UAV include thermal cameras, visual cameras, multi-spectral cameras, and RGB cameras;
acquiring (306), by navigating the UAV over the one or more assets in the presence of magnetic interference through a dynamically corrected flight path, data pertaining to one or more parts of the one or more assets, wherein at least a subset of the data acquired comprises a plurality of images captured from multiple views, wherein the information related to orientation and direction of the UAV in the presence of magnetic interference is determined using the plurality of images captured by the plurality of sensors integrated with the UAV, wherein the plurality of images captured include thermal images, visual images, multispectral images and RGB images, wherein the UAV navigates autonomously in the presence of magnetic interference, at different heights and orientations from the one or more assets, by dynamically correcting the flight path, and wherein the UAV dynamically corrects its flight path, in real time, by:
detecting, the one or more assets in each of the plurality of images captured, wherein the one or more assets are detected from the visual images, the multispectral images and the RGB images using a patch based neural network, which comprises of:
splitting, each of the plurality of images captured into small sized non-overlapping patches; and
analyzing, the non-overlapping patches for detection of the one or more assets using a convolutional neural network;
detecting, the one or more assets from the thermal images for navigation, using an adaptive threshold method which comprises segmentation of the one or more assets from a scene by changing a threshold dynamically over each of the plurality of images based on relative variation of temperature of the one or more assets with respect to surroundings;
calculating, deviation of the one or more assets with respect to center of each of the plurality of images captured, in terms of pixel coordinates;
converting, the pixel coordinates into coordinates in meters; and
correcting, the position of the UAV by providing roll correction to the UAV if the calculated deviation exceeds a tolerance level;
identifying (308), using domain knowledge driven machine learning technique(s), a region of interest (ROI) in the one or more parts of the one or more assets to obtain a plurality of segmented ROI images;
extracting (310), a plurality of features from each of the plurality of segmented ROI images to detect anomalies in the one or more assets; and classifying (312), the detected anomalies as one of (i) a potential anomaly or (ii) a non-potential anomaly to predict failure of the one or more assets.

2. The method of claim 1, wherein the plurality of images are acquired at different wavelengths during navigation of the UAV.

3. The method of claim 1, wherein the potential anomalies are further categorized as long-term impact, medium-term impact, short-term impact and immediate impact anomalies using an unsupervised learning technique.

4. A system (102), comprising:
a memory (202) storing instructions;
one or more communication interfaces (206); and
one or more hardware processors (204) coupled to the memory (202) via the one or more communication interfaces (206), wherein the one or more hardware processors (204) are configured by the instructions to:
estimate, an initial position of an unmanned aerial vehicle (UAV) inspecting one or more assets in one or more infrastructures;
determine, using a plurality of sensors integrated with the UAV, information related to orientation and direction of the UAV in presence of magnetic interference, wherein the plurality of sensors integrated with the UAV include thermal cameras, visual cameras, multi-spectral cameras, and RGB cameras;
acquire, by navigating the UAV over the one or more assets in the presence of magnetic interference through a dynamically corrected flight path, data pertaining to one or more parts of the one or more assets, wherein at least a subset of the data acquired comprises a plurality of images captured from multiple views, wherein the information related to orientation and direction of the UAV in the presence of magnetic interference is determined using the plurality of images captured by the plurality of sensors integrated with the UAV, wherein the plurality of images captured include thermal images, visual images, multispectral images and RGB images, wherein the UAV navigates autonomously in the presence of magnetic interference, at different heights and orientations from the one or more assets, by dynamically correcting the flight path, and wherein to dynamically correct the flight path of the UAV, in real time, the one or more hardware processors (204) are further configured to:
detect the one or more assets in each of the plurality of images captured, wherein the one or more assets are detected from the visual images, the multispectral images and the RGB images using a patch based neural network, which comprises of:
splitting each of the plurality of images captured into small sized non-overlapping patches; and
analyzing the non-overlapping patches for detection of the one or more assets using a convolutional neural network;
detect the one or more assets from the thermal images for navigation, using an adaptive threshold method which comprises segmentation of the one or more assets from a scene by changing a threshold dynamically over each of the plurality of images based on relative variation of temperature of the one or more assets with respect to surroundings;
calculate deviation of the one or more assets with respect to center of each of the plurality of images captured, in terms of pixel coordinates;
convert the pixel coordinates into coordinates in meters; and
correct the position of the UAV by providing roll correction to the UAV if the calculated deviation exceeds a tolerance level;
identify, using domain knowledge driven machine learning technique(s), a region of interest (ROI) in the one or more parts of the one or more assets to obtain a plurality of segmented ROI images;
extract, a plurality of features from each of the plurality of segmented ROI images to detect anomalies in the one or more assets; and
classify, the detected anomalies as one of (i) a potential anomaly or (ii) a non-potential anomaly to predict failure of the one or more assets.

5. The system of claim 4, wherein the plurality of images are acquired at different wavelengths during navigation of the UAV.

6. The system of claim 4, wherein the potential anomalies are further categorized as long-term impact, medium-term impact, short-term impact and immediate impact anomalies using an unsupervised learning technique.

7. One or more non-transitory computer readable mediums comprising one or more instructions which when executed by one or more hardware processors cause:
estimating, an initial position of an unmanned aerial vehicle (UAV) inspecting one or more assets in one or more infrastructures;
determining, using a plurality of sensors integrated with the UAV, information related to orientation and direction of the UAV in presence of magnetic interference, wherein the plurality of sensors integrated with the UAV include thermal cameras, visual cameras, multi-spectral cameras, and RGB cameras;
acquiring, by navigating the UAV over the one or more assets in the presence of magnetic interference through a dynamically corrected flight path, data pertaining to one or more parts of the one or more assets, wherein at least a subset of the data acquired comprises a plurality of images captured from multiple views, wherein the information related to orientation and direction of the UAV in the presence of magnetic interference is determined using the plurality of images captured by the plurality of sensors integrated with the UAV, wherein the plurality of images captured include thermal images, visual images, multispectral images and RGB images, wherein the UAV navigates autonomously in the presence of magnetic interference, at different heights and orientations from the one or more assets, by dynamically correcting the flight path, and wherein the UAV dynamically corrects its flight path, in real time, by:
detecting, the one or more assets in each of the plurality of images captured, wherein the one or more assets are detected from the visual images, the multispectral images and the RGB images using a patch based neural network, which comprises of:
splitting, each of the plurality of images captured into small sized non-overlapping patches; and
analyzing, the non-overlapping patches for detection of the one or more assets using a convolutional neural network;
detecting, the one or more assets from the thermal images for navigation, using an adaptive threshold method which comprises segmentation of the one or more assets from a scene by changing a threshold dynamically over each of the plurality of images based on relative variation of temperature of the one or more assets with respect to surroundings;

calculating, deviation of the one or more assets with respect to center of each of the plurality of images captured, in terms of pixel coordinates;

converting, the pixel coordinates into coordinates in meters; and correcting, the position of the UAV by providing roll correction to the UAV if the calculated deviation exceeds a tolerance level;

identifying, using domain knowledge driven machine learning technique(s), a region of interest (ROI) in the one or more parts of the one or more assets to obtain a plurality of segmented ROI images;

extracting, a plurality of features from each of the plurality of segmented ROI images to detect anomalies in the one or more assets; and classifying, the detected anomalies as one of (i) a potential anomaly or (ii) a non-potential anomaly to predict failure of the one or more assets.

8. The one or more non-transitory computer readable mediums of claim 7, wherein the plurality of images are acquired at different wavelengths during navigation of the UAV.

9. The one or more non-transitory computer readable mediums of claim 7, wherein the potential anomalies are further categorized as long-term impact, medium-term impact, short-term impact and immediate impact anomalies using an unsupervised learning technique.

* * * * *